US012790877B2

(12) United States Patent
Seok et al.

(10) Patent No.: US 12,790,877 B2
(45) Date of Patent: Nov. 10, 2026

(54) DOOR CONTROL DEVICE AND VEHICLE HAVING THE SAME

(71) Applicants: Hyundai Motor Company, Seoul (KR); Kia Corporation, Seoul (KR)

(72) Inventors: Donghee Seok, Seoul (KR); Yocheol Jang, Suwon-si (KR); Duckyoung Kim, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 334 days.

(21) Appl. No.: 18/344,224

(22) Filed: Jun. 29, 2023

(65) Prior Publication Data

US 2024/0191554 A1 Jun. 13, 2024

(30) Foreign Application Priority Data

Dec. 10, 2022 (KR) ........................ 10-2022-0172112

(51) Int. Cl.

| | |
|---|---|
| ***E05F 15/71*** | (2015.01) |
| ***E05B 81/56*** | (2014.01) |
| ***E05B 83/12*** | (2014.01) |
| ***E05F 15/40*** | (2015.01) |
| ***E05F 15/42*** | (2015.01) |

(52) U.S. Cl.

CPC .............. *E05F 15/71* (2015.01); *E05B 81/56* (2013.01); *E05B 83/12* (2013.01); *E05F 15/40* (2015.01); *E05F 2015/483* (2015.01); *E05Y 2400/44* (2013.01); *E05Y 2400/818* (2013.01);

(Continued)

(58) Field of Classification Search

CPC .......... E05F 15/71; E05B 81/56; E05B 83/12; E05Y 2400/44; B60Q 9/00; B60R 21/00

See application file for complete search history.

(56) References Cited

U.S. PATENT DOCUMENTS 5,434,487 A * 7/1995 Long ........................ E05F 15/70 49/32

2005/0222726 A1 * 10/2005 Furui .................. B60R 16/0231 701/1

(Continued)

FOREIGN PATENT DOCUMENTS

JP H 06-344773 A 12/1994

JP 2020-111135 A 7/2020

(Continued)

OTHER PUBLICATIONS

Office Action in Korean Appln. No. 10-2022-0172112, mailed on Aug. 27, 2026, 15 pages (with English translation).

*Primary Examiner* — Toya Pettiegrew

(74) *Attorney, Agent, or Firm* — Fish & Richardson P.C.

(57) ABSTRACT

A door control device includes a communicator configured to receive gear position information, obstacle information, and wind speed information, and a processor. The processor is configured to determine at least two of a gear position, presence or absence of an obstacle, or a wind speed based on the gear position information, the obstacle information, and the wind speed information, and, based on a determination that (i) the gear position is at parking and the obstacle exists or (ii) the gear position is at parking and the wind speed is greater than or equal to a reference wind speed, control a safety device of a door to secure a position of the door.

18 Claims, 12 Drawing Sheets

(52) U.S. Cl.
CPC ..... *E05Y 2800/40* (2013.01); *E05Y 2900/516* (2013.01); *E05Y 2900/531* (2013.01)

(56) References Cited

U.S. PATENT DOCUMENTS

| | | | | |
|---|---|---|---|---|
| 2019/0017299 A1* | 1/2019 | Capalau | .................. | E05B 77/30 |
| 2020/0224476 A1* | 7/2020 | Kito | ........................ | E05F 15/71 |
| 2023/0304351 A1* | 9/2023 | Kaneda | .................. | B60J 5/0472 |

FOREIGN PATENT DOCUMENTS

| | | |
|---|---|---|
| KR | 10-1998-039770 | 8/1998 |
| KR | 10-2002-0050649 | 6/2002 |

* cited by examiner

FIG. 11

| TILT | CARGO DOOR | FIRST CARGO DOOR | | SECOND CARGO DOOR | |
|---|---|---|---|---|---|
| | DEGREE OF OPENING | DEGREE OF OPENING < FIRST REFERENCE OPENING DEGREE | FIRST REFERENCE OPENING DEGREE ≤ DEGREE OF OPENING | DEGREE OF OPENING < FIRST REFERENCE OPENING DEGREE | FIRST REFERENCE OPENING DEGREE ≤ DEGREE OF OPENING |
| FORWARD | WHEN OPENING | PREVENTION OF REVERSE MOVEMENT | MAINTENANCE OF MOVEMENT SPEED | PREVENTION OF REVERSE MOVEMENT | MAINTENANCE OF MOVEMENT SPEED |
| | WHEN CLOSING | MAINTENANCE OF MOVEMENT SPEED | PREVENTION OF REVERSE MOVEMENT | MAINTENANCE OF MOVEMENT SPEED | PREVENTION OF REVERSE MOVEMENT |
| BACKWARD | WHEN OPENING | MAINTENANCE OF MOVEMENT SPEED | PREVENTION OF REVERSE MOVEMENT | MAINTENANCE OF MOVEMENT SPEED | PREVENTION OF REVERSE MOVEMENT |
| | WHEN CLOSING | PREVENTION OF REVERSE MOVEMENT | MAINTENANCE OF MOVEMENT SPEED | PREVENTION OF REVERSE MOVEMENT | MAINTENANCE OF MOVEMENT SPEED |

FIG. 12

| TILT | CARGO DOOR | FIRST CARGO DOOR | | SECOND CARGO DOOR | |
| --- | --- | --- | --- | --- | --- |
| | DEGREE OF OPENING | DEGREE OF OPENING < SECOND REFERENCE OPENING DEGREE | SECOND REFERENCE OPENING DEGREE ≤ DEGREE OF OPENING | DEGREE OF OPENING < SECOND REFERENCE OPENING DEGREE | SECOND REFERENCE OPENING DEGREE ≤ DEGREE OF OPENING |
| LEFT | WHEN OPENING | MAINTENANCE OF MOVEMENT SPEED | PREVENTION OF REVERSE MOVEMENT | PREVENTION OF REVERSE MOVEMENT | MAINTENANCE OF MOVEMENT SPEED |
| | WHEN CLOSING | PREVENTION OF REVERSE MOVEMENT | MAINTENANCE OF MOVEMENT SPEED | MAINTENANCE OF MOVEMENT SPEED | PREVENTION OF REVERSE MOVEMENT |
| RIGHT | WHEN OPENING | PREVENTION OF REVERSE MOVEMENT | MAINTENANCE OF MOVEMENT SPEED | MAINTENANCE OF MOVEMENT SPEED | PREVENTION OF REVERSE MOVEMENT |
| | WHEN CLOSING | MAINTENANCE OF MOVEMENT SPEED | PREVENTION OF REVERSE MOVEMENT | PREVENTION OF REVERSE MOVEMENT | MAINTENANCE OF MOVEMENT SPEED |

DOOR CONTROL DEVICE AND VEHICLE HAVING THE SAME

CROSS-REFERENCE TO RELATED APPLICATION

This application is based on and claims priority under 35 U.S.C. § 119 to Korean Patent Application No. 10-2022-0172112, filed on Dec. 10, 2022, in the Korean Intellectual Property Office, the disclosure of which is incorporated herein by reference.

TECHNICAL FIELD

The disclosure relates to a door control device for preventing safety accidents that may occur by opening and closing a door and a vehicle having the same.

BACKGROUND

Vehicles are categorized based on their purpose, such as passenger cars, buses, trucks, specialized vehicles.

These vehicles are equipped with doors that serve various functions, including passenger entry and exit, as well as cargo loading and unloading. Conventional vehicles have front doors primarily used by front occupants and rear doors mainly used by rear occupants. A conventional truck may have additional doors located at the back and on the side of the vehicle body.

A vehicle's door system may include several components, including a hinge that allows the door to rotate, a door checker that blocks the door from opening beyond a predetermined angle, and a door locker to secure the door in a closed position.

However, a truck door for cargo delivery may be different because the truck door has a wider range of motion, increasing a risk of safety accidents in the surrounding environment during opening or closing processes.

For example, when a delivery person opens a truck door without recognizing an approaching obstacle from the side of truck or if the truck door forcefully opens due to strong wind, accidents may occur, potentially causing damages to nearby obstacles. Moreover, when a delivery person opens the truck door while the cargo inside the truck pushes the door, the weight of cargo can lead to damage nearby objects and even injury to the delivery person.

Accordingly, technologies are required to safely open, close and lock, or brake vehicle doors.

SUMMARY

The present disclosure is directed to a door control device and a vehicle having the same that may, when a gear position is a parking position, an obstacle exists, or a wind speed is greater than or equal to a reference wind speed, output warning information, fix a position of a door, and control a movement speed or reverse movement of the door based on a slope of a road.

The disclosure is also directed to a door control device and a vehicle having the same that may control locking of a door of the vehicle, when a gear position is a drive position, reverse or neutral position.

According to an aspect of the disclosure, a door control device may include: a communicator configured to receive gear position information, obstacle information, and wind speed information; and a processor configured to: identify at least two of a gear position, presence or absence of an obstacle, or a wind speed based on the gear position information, the obstacle information, and the wind speed information, and based on a determination that the identified gear position is a parking position and the obstacle exists, or based on a determination that the identified gear position is the parking position and the identified wind speed is greater than or equal to a reference wind speed, control a safety device of a door to fix a position of the door.

According to an aspect of the disclosure, the door control device may further include a display device provided on the door. The processor of the door control device may be configured to control the display device to display warning information, based on the determination that the identified gear position is the parking position and the obstacle exists, or based on the determination that the identified gear position is the parking position and the identified wind speed is greater than or equal to the reference wind speed.

According to an aspect of the disclosure, the processor of the door control device may be configured to control the door to be locked, in response to the gear position being a drive position, a reverse position or a neutral position.

According to an aspect of the disclosure, the door control device may further include a state detection device configured to detect state information of the door. The communicator of the door control device may be configured to receive tilt information of a vehicle. The processor of the door control device may be configured to determine whether the vehicle is tilted forward, backward, to a first side or a second side based on the tilt information of the vehicle, determine whether the door is being changed from a closed state to an open state, or from the open state to the closed state, based on the state information of the door, identify a degree of opening of the door based on the state information of the door, and control to maintain a movement speed of the door or to restrict a movement of the door in an opposite direction to a moving direction of the door, based on the received tilt information of the vehicle, the state information of the door, and the degree of opening of the door.

According to an aspect of the disclosure, the processor of the door control device may be configured to, based on a determination that the vehicle is tilted forward and the door is being changed from the closed state to the open state, determine whether the degree of opening of the door is greater than or equal to a first reference opening degree, based on a determination that the degree of opening of the door is greater than or equal to the first reference opening degree, control to maintain a movement speed of the door in a moving direction for proceeding to the open state, and based on a determination that the degree of opening of the door is less than the first reference opening degree, control to restrict a movement of the door in an opposite direction to the moving direction of the door.

According to an aspect of the disclosure, the processor of the door control device may be configured to, based on a determination that the vehicle is tilted forward and the door is being changed to the closed state from the open state, determine whether the degree of opening of the door is less than a first reference opening degree, based on a determination that the degree of opening of the door is less than the first reference opening degree, control to maintain a movement speed of the door in a moving direction for proceeding to the closed state, and based on a determination that the degree of opening of the door is greater than or equal to the first reference opening degree, control to restrict a movement of the door in an opposite direction to the moving direction of the door.

According to an aspect of the disclosure, the processor of the door control device may be configured to, based on a determination that the vehicle is tilted backward and the door is being changed from the closed state to the open state, determine whether the degree of opening of the door is less than a first reference opening degree, based on a determination that the degree of opening of the door is less than the first reference opening degree, control to maintain a movement speed of the door in a moving direction for proceeding to the open state, and based on a determination that the degree of opening of the door is greater than or equal to the first reference opening degree, control to restrict a movement of the door in an opposite direction to the moving direction of the door.

According to an aspect of the disclosure, the processor of the door control device may be configured to, based on a determination that the vehicle is tilted backward and the door is being changed to the closed state from the open state, determine whether the degree of opening of the door is greater than or equal to a first reference opening degree, based on a determination that the degree of opening of the door is greater than or equal to the first reference opening degree, control to maintain a movement speed of the door in a moving direction for proceeding to the closed state, and based on a determination that the degree of opening of the door is less than the first reference opening degree, control to restrict a movement of the door in an opposite direction to the moving direction of the door.

According to an aspect of the disclosure, the processor of the door control device may be configured to, based on the vehicle being tilted to the first side, determine whether the door opens or closes on an axis of the first side, based on a determination that the door opens or closes on the axis of the first side and the door is being changed from the closed state to the open state, determine whether the degree of opening of the door is less than a second reference opening degree, based on a determination that the degree of opening of the door is less than the second reference opening degree, control to maintain a movement speed of the door in a moving direction for proceeding to the open state, and based on a determination that the degree of opening of the door is greater than or equal to the second reference opening degree, control to restrict a movement of the door in an opposite direction to the moving direction of the door.

According to an aspect of the disclosure, the processor of the door control device may be configured to, based on a determination that the vehicle is tilted to the first side, the door opens or closes on an axis of the first side, and the door is being changed to the closed state from the open state, determine whether the degree of opening of the door is greater than or equal to a second reference opening degree, based on a determination that the degree of opening of the door is greater than or equal to the second reference opening degree, control to maintain a movement speed of the door in a moving direction for proceeding to the closed state, and based on a determination that the degree of opening of the door is less than the second reference opening degree, control to restrict a movement of the door in an opposite direction to the moving direction of the door.

According to an aspect of the disclosure, the processor of the door control device may be configured to, based on the vehicle being tilted to the first side, determine whether the door opens or closes on an axis of the second side, based on a determination that the door opens or closes on the axis of the second side and the door is being changed from the closed state to the open state, determine whether the degree of opening of the door is greater than or equal to a second reference opening degree, based on a determination that the degree of opening of the door is greater than or equal to the second reference opening degree, control to maintain a movement speed of the door in a moving direction for proceeding to the open state, and based on a determination that the degree of opening of the door is less than the second reference opening degree, control to restrict a movement of the door in an opposite direction to the moving direction of the door.

According to an aspect of the disclosure, the processor of the door control device may be configured to, based on a determination that the vehicle is tilted to the first side, the door opens or closes on an axis of the second side, and the door is being changed to the closed state from the open state, determine whether the degree of opening of the door is less than a second reference opening degree, based on a determination that the degree of opening of the door is less than the second reference opening degree, control to maintain a movement speed of the door in a moving direction for proceeding to the closed state, and based on a determination that the degree of opening of the door is greater than or equal to the second reference opening degree, control to restrict a movement of the door in an opposite direction to the moving direction of the door.

According to another aspect of the disclosure, a vehicle may include: a door; a safety device provided in the door; a state detection device configured to detect a state of the door; an input device of shift range; a tilt detector configured to detect a tilt; and a door control device configured to: turn on a safety mode in response to a gear position of the input device of shift range being a parking position, and during the safety mode, control to maintain a movement speed of the door, or restrict a movement of the door based on the detected tilt.

According to another aspect of the disclosure, the vehicle may further include at least one of a camera or an obstacle detector. The door control device of the vehicle may be configured to: determine whether an obstacle exists based on image information of the camera and obstacle detection information of the obstacle detector, and based on a determination that the obstacle exists, control the safety device to fix a position of the door.

According to another aspect of the disclosure, the vehicle may further include at least one of a display device or a speaker. The door control device of the vehicle may be configured to: based on a determination that the obstacle exists, control at least one of the display device or the speaker to output warning information.

According to another aspect of the disclosure, the vehicle may further include a wind speed detector configured to detect a wind speed. The door control device of the vehicle may be configured to: determine whether the detected wind speed is greater than or equal to a reference wind speed based on information about the detected wind speed, and based on a determination that the detected wind speed is greater than or equal to the reference wind speed, control the safety device to fix a position of the door.

According to another aspect of the disclosure, the door control device of the vehicle may be configured to control the door to be locked, in response to the gear position being a drive position, a reverse position or a neutral position.

According to another aspect of the disclosure, the door control device of the vehicle may be configured to determine whether the vehicle is tilted forward, backward, to a first side or a second side based on tilt information of the vehicle, determine whether the door is being changed from a closed state to an open state, or from the open state to the closed state, based on state information of the door, identify a degree of opening of the door based on the state information of the door, and control to maintain a movement speed of the door or to restrict a movement of the door in an opposite direction to a moving direction of the door, based on the tilt information of the vehicle, the state information of the door, and the degree of opening of the door.

According to another aspect of the disclosure, the door control device of the vehicle may be configured to control the door not to move above a preset movement speed, when the movement speed of the door is controlled to be maintained.

According to another aspect of the disclosure, the safety device of the vehicle may include a braking device to control braking of the door and a locking device to control locking of the door.

BRIEF DESCRIPTION OF THE DRAWINGS

FIGS. 11 and 12 are diagrams illustrating examples of control parameters of a first cargo door and a second cargo door corresponding to a state of each of the first and second cargo doors of a vehicle.

DETAILED DESCRIPTION

Figure 1:
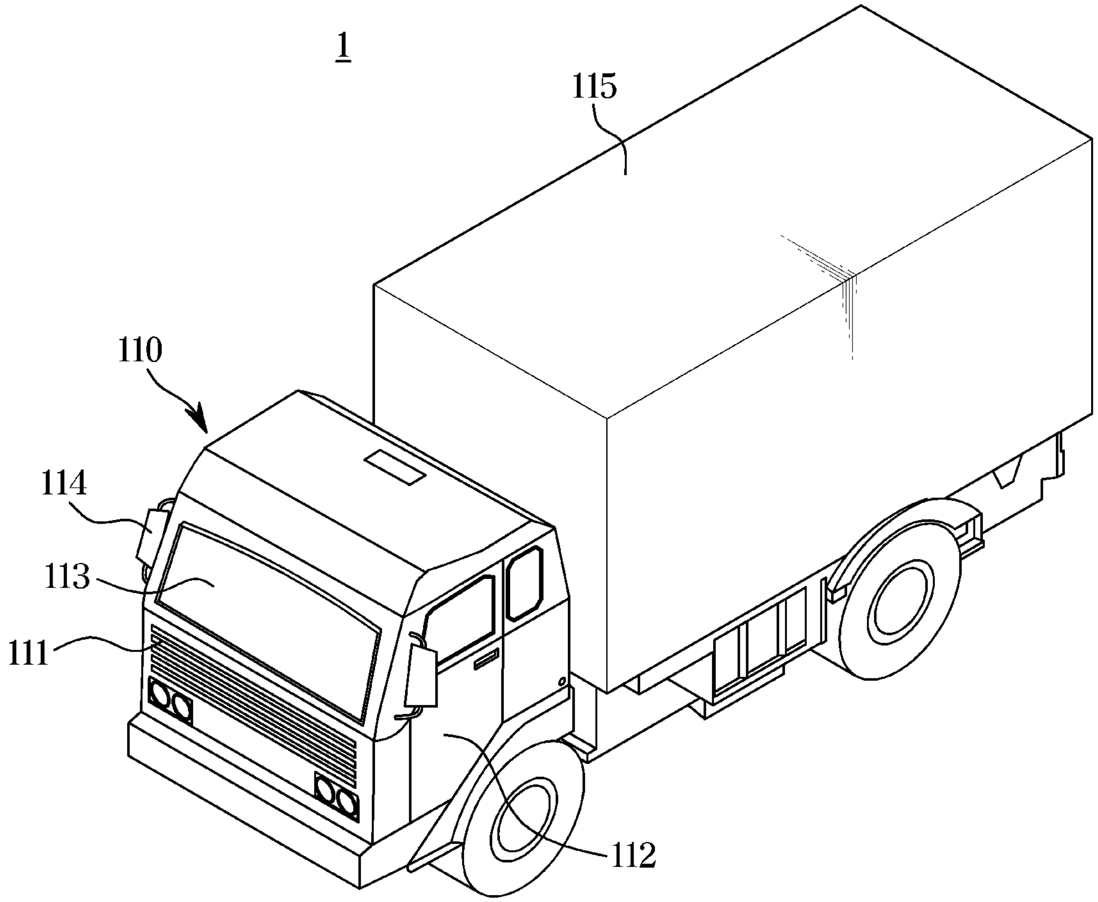
FIG. 1 is a diagram illustrating an example of an exterior of a vehicle.
Figure 2:
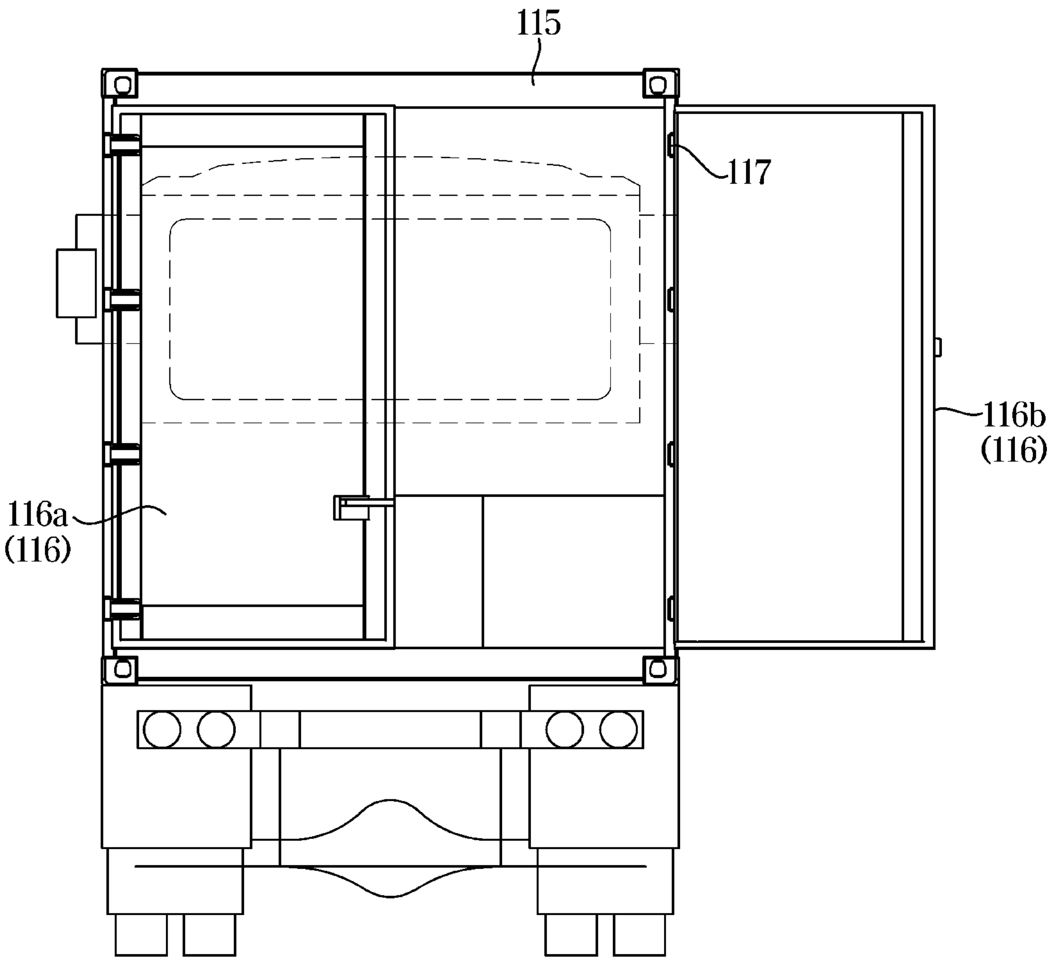
FIGS. 2 and 3 are diagrams illustrating an example of doors of a vehicle shown in FIG. 1.
Figure 3:
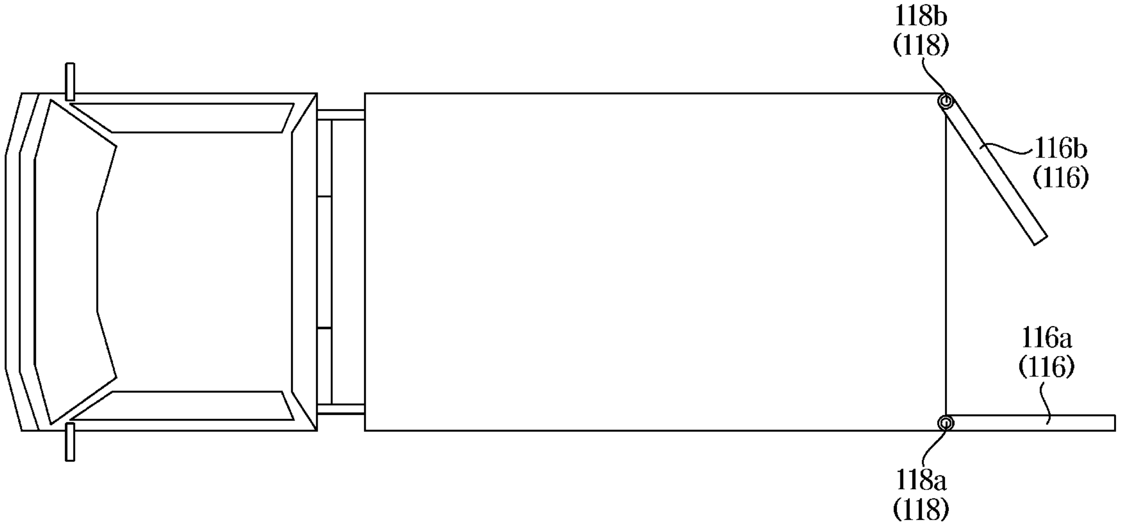

FIG. 1 is a diagram illustrating an exterior of a vehicle. FIGS. 2 and 3 are diagrams illustrating an example of cargo doors of a vehicle shown in FIG. 1. In some examples, a vehicle may be a truck for cargo delivery.

A vehicle 1 includes a body having an exterior and an interior, and a chassis where mechanical devices for driving are mounted as a remaining portion except for the body.

The vehicle 1 includes a tractor 110 having motive power and a trailer 115 detachably coupled to the tractor 110 and for loading cargo.

The tractor 110 is for hauling the trailer 115, and may include a body having an exterior and an interior, and a chassis where mechanical devices for driving are mounted as a remaining portion except for the body.

The exterior of the body includes a hood 111, front left and right doors 112, a front windshield glass 113, and side mirrors 114 for providing a driver with a rear field of view.

When the vehicle is an eco-friendly vehicle, an air conditioning device, a drive motor, a speed reducer, an electric power control device, a motor control device, a battery cooling device, and a battery may be provided under the tractor 110 or inside the hood 111.

The trailer 115 is provided with a space for loading various types of cargo.

The trailer 115 is provided with door 116 (116A and 116B) for opening or closing the space. The door 116 provided in the trailer 115 is also referred to as a cargo door.

The cargo door 116 (116A and 116B) may be fixed to the trailer 115 by a hinge 117, and be rotatably mounted to the trailer 115 by the hinge 117.

The first cargo door 116A is provided on a left side of an opening of the trailer to open or close the left side of the opening of the trailer.

When opening, the first cargo door 116A rotates from right to left, and when closing, the first cargo door 116A rotates from left to right.

A moving direction when opening the first cargo door 116A may be clockwise, from right to left.

A moving direction when closing the first cargo door 116A may be counterclockwise, from left to right.

The second cargo door 116B is provided on a right side of the opening of the trailer to open or close the right side of the opening of the trailer 115.

When opening, the second cargo door 116B rotates from left to right, and when closing, the second cargo door 116B rotates from right to left.

A moving direction when opening the second cargo door 116B may be counterclockwise, from left to right.

A moving direction when closing the second cargo door 116B may be clockwise, from right to left.

A safety device 118 (118A and 118B) may be provided with the cargo door 116.

As shown in FIG. 3, the first cargo door 116A may be provided with the first safety device 118A for preventing a safety accident caused by opening and closing of the first cargo door 116A.

The second cargo door 116B may be provided with the second safety device 118B for preventing a safety accident caused by opening and closing of the second cargo door 116B.

The first safety device 118A and the second safety device 118B may be connected to the trailer 115.

The first safety device 118A may include a first braking device controlling an operation of the first cargo door in an opposite direction to an opening direction of the first cargo door.

The first safety device 118A may include a first locking device fixing the second cargo door to a current opening angle (or a closing angle).

The first safety device 118A may include both the first braking device and the first locking device.

The first braking device and the first locking device may be implemented as a single assembly.

The first braking device and the first locking device may be implemented as separate assemblies.

The first braking device and the first locking device may be implemented as a gear type, an electrical type or a hydraulic type.

The second safety device 118B may include a second braking device controlling an operation of the second cargo door in an opposite direction to an opening direction of the second cargo door.

The second safety device 118B may include a second locking device fixing the second cargo door to a current opening angle (or a closing angle).

The second safety device 118B may include both the second braking device and the second locking device.

The second braking device and the second locking device may be implemented as a single assembly.

The second braking device and the second locking device may be implemented as separate assemblies.

The second braking device and the second locking device may be implemented as a gear type, an electrical type or a hydraulic type.

The trailer 115 may be moved by motive power of the tractor 110, thereby carrying cargo loaded in the trailer 115.

Figure 4:
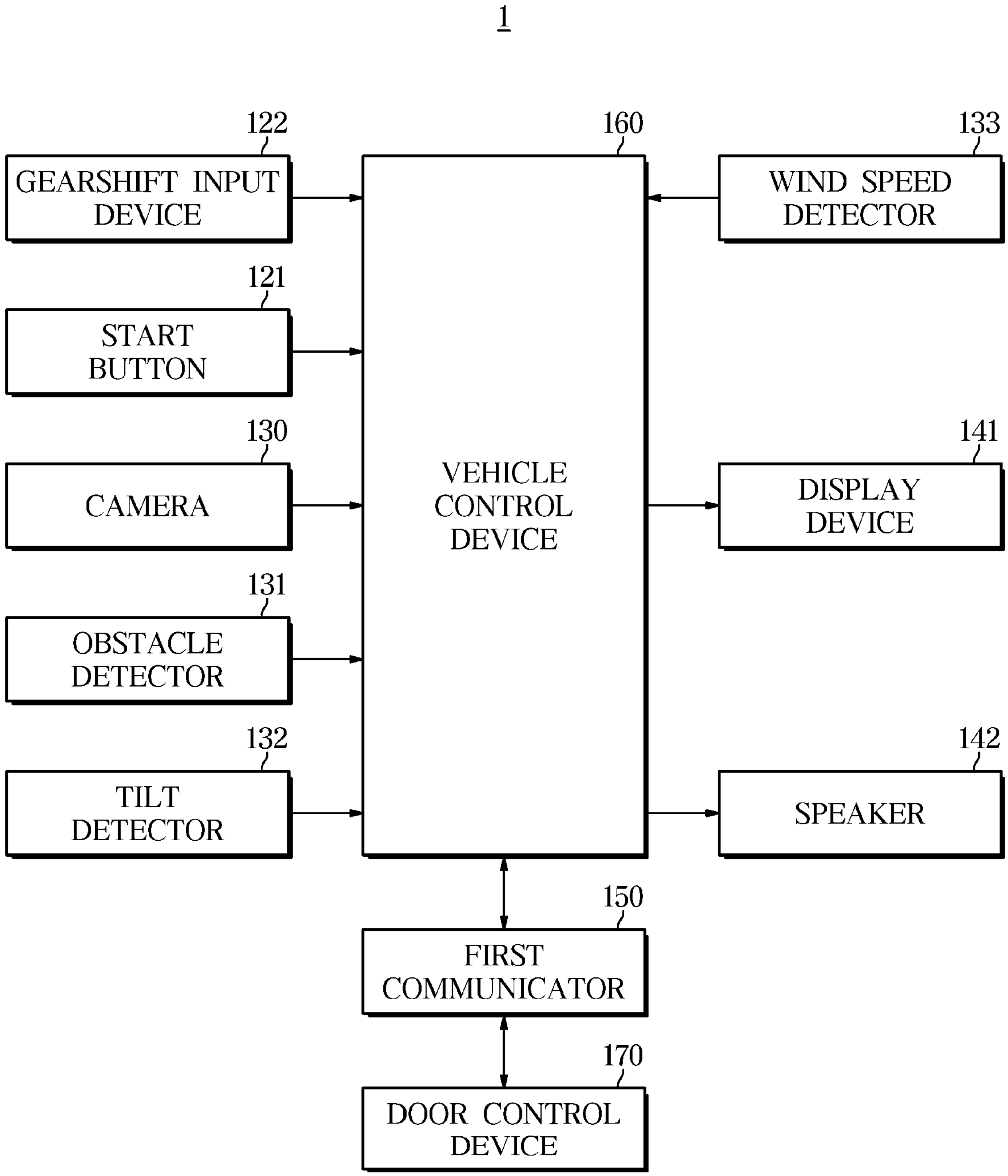
FIG. 4 is a control block diagram of an example of a vehicle.

FIG. 4 is a control block diagram of a vehicle.

The vehicle 1 includes a start button 121, a gearshift input device 122, a camera 130, an obstacle detector 131, a tilt detector 132, a wind speed detector 133, a display device 141, a speaker 142, a first communicator 150, a vehicle control device 160, and a door control device 170.

The start button 121 receives a user input.

The start button 121 may receive a vehicle ON command, a vehicle OFF command, and an accessory power ON/OFF command, as a user input.

A gearshift input device includes an input device of shift range. The input device of shift range may be shifted to one of P, R, N or D position, in response to a user input.

When the vehicle is an internal combustion engine vehicle, a parking position P is for preventing an engine from starting and receiving a parking command.

A Reverse position R is for preventing an engine from starting and receiving a reverse command.

A neutral position N is for allowing an engine to start and preventing power of the engine from being transferred to an output shaft.

A drive position (or forward position) D is for enabling automatic transmission in a plurality of gears depending on transmission conditions and receiving a forward command.

The gearshift input device 122 may be implemented as a dial type or a button type, not a lever type.

The vehicle 1 may further include an electronic parking brake (EPB) button provided on a head unit or around the input device of shift range and receiving an operation command of an EPB system.

The camera 130 may obtain an image around the vehicle.

A single or a plurality of cameras 130 may be provided.

Each of the plurality of cameras 130 may include a plurality of lens and image sensors. The image sensors may include a plurality of photodiodes converting light into an electrical signal, and the plurality of photodiodes may be arranged in a two-dimensional (2D) matrix.

Each of the plurality of cameras 130 may include a complementary metal oxide semiconductor (CMOS) image sensor or a charge coupled device (CCD) image sensor, and also include a three-dimensional (3D) space recognition sensor such as a KINECT (RGB-D sensor), time of flight (TOF) camera, stereo camera, etc.

When the plurality of cameras 130 are provided, the plurality of cameras 130 may include first, second, third and fourth cameras obtaining a front field of view, a right field of view, a left field of view and a rear field of view, respectively.

The first camera may obtain a road image in front of the vehicle. In this case, the first camera may be provided on the front windshield glass 113 and the hood 111.

The first camera may be provided to be exposed on a rear-view mirror or roof panel inside the vehicle, or may be provided on a license plate, a grill or an emblem on a front of the vehicle.

The second camera may obtain a road image at rear of the vehicle. In this case, the second camera may be provided on a license plate or an emblem at the rear of the vehicle.

The third camera may obtain a road image of a left side of the vehicle. In this case, the third camera may be provided on the left side mirror 114.

The fourth camera may obtain a road image of a right side of the vehicle. In this case, the fourth camera may be provided on the right side mirror 114.

The obstacle detector 131 may detect an existence and a location of an obstacle located in front of, at the rear of, on the left and right sides of the vehicle 1.

The obstacle detector 131 may be provided in the tractor 110 and the trailer 115 of the vehicle.

The obstacle detector 131 may include at least one laser imaging, detection, and ranging (lidar) sensor.

The lidar sensor is a non-contact distance detection sensor using a laser radar principle.

The lidar sensor has a higher detection accuracy in a lateral direction than a radio detection and ranging (RaDAR) sensor.

The obstacle detector 131 may include at least one radar sensor. The radar sensor is a sensor that detects a position and a distance of an object by using a reflected wave generated by radiation of radio waves when transmission and reception are performed in a same place.

The obstacle detector 131 may include at least one ultrasonic sensor.

The ultrasonic sensor generates ultrasonic waves for a predetermined period of time, and then detects a signal reflected from an object.

The ultrasonic sensor may be used to determine presence or absence of an obstacle such as a pedestrian, and the like, within a short distance.

The tilt detector 132 may detect a tilt of the vehicle.

The tilt detector 132 may detect front and rear tilt of the vehicle and left and right tilt of the vehicle.

The tilt detector 132 may be an acceleration sensor, or include at least one of a gyro sensor, an angular velocity sensor, or a gravity sensor.

Tilt information of a road may be obtained from pre-stored navigation information and advanced driver assistance system (ADAS) map information. In this case, the tilt detector 132 may be omitted.

The wind speed detector 133 detects a strength of wind around the first and second cargo doors, i.e., a speed of the wind.

The wind speed detector 133 may further include a wind direction detector detecting a wind direction around the first and second cargo doors, and further include a wind speed and direction detector detecting both wind speed and wind direction together.

The wind speed detector 133 may be one of a windmill type, a wind rose type, or an ultrasonic type.

The vehicle may include a pressure detector detecting a pressure applied to the first and second cargo doors by wind.

The display device 141 displays operation information about a function being performed in the vehicle.

The display device 141 may display warning information caused by opening and closing the first and second cargo doors in response to a vehicle OFF state or a parking state.

The display device 141 may display route information for delivery, identification information of items, and delivery address information.

The speaker 142 outputs a sound signal of a function being performed in the vehicle as sound. A single or a plurality of speakers 142 may be provided.

The speaker 142 may output the identification information of items, the delivery address information, and parking location information for delivery as voice.

The speaker 142 may output a warning sound caused by opening and closing the first and second cargo doors in response to a vehicle OFF state or a parking state.

The first communicator 150 may include at least one constituent component enabling communication with external devices and the internal devices of the vehicle, for example, at least one of a short-range communication module, wireless communication module, or a wired communication module. Here, the external device may be a server and a mobile device.

The short-range communication module may include a variety of short-range communication modules that transmit and receive signals in a short distance using a wireless communication network, such as a Bluetooth module, infrared communication module, radio frequency identification (RFID) communication module, wireless local access network (WLAN) communication module, near-field communication (NFC) communication module, Zigbee communication module, and the like.

The wired communication module may include various wired communication modules such as a controller area network (CAN) communication module, local area network (LAN) module, wide area network (WAN) module, value added network (VAN) module, or the like, and also include various cable communication modules such as a universal serial bus (USB), high definition multimedia interface (HDMI), digital visual interface (DVI), recommended standard 232 (RS-232), power line communication, plain old telephone service (POTS), or the like.

The wireless communication module may include wireless communication modules that support a variety of wireless communication methods such as a global system for mobile communication (GSM), code division multiple access (CDMA), wideband CDMA (WCDMA), universal mobile telecommunications system (UMTS), time division multiple access (TDMA), long term evolution (LTE), ultra wideband (UWB), and the like, in addition to a Wifi module and a Wibro module.

The first communicator 150 may perform USB communication, Wi-Fi communication, and Bluetooth communication, and may further perform broadcasting communication such as SXM, and radio data system (RDS) and transport protocol experts group (TPEG), digital multimedia broadcasting (DMB), and 2G, 3G, 4G and 5G communication.

The first communicator 150 may include a first location receiver (or global positioning system (GPS) receiver) that communicates with a plurality of satellites and recognizes a current location based on information provided by the plurality of satellites.

That is, the location receiver receives a signal transmitted by the satellites, identifies a current location of the vehicle, and transmits current location information about the identified current location to a processor.

The vehicle control device 160 may receive a signal corresponding to a position of the gearshift input device 122, and a vehicle ON command and a vehicle OFF command of the start button 121.

The vehicle control device 160 may receive an image obtained by the camera 130, perform image processing on the received image, and then recognize an obstacle in the image-processed image and obtain location information of the recognized obstacle.

The vehicle control device 160 may also recognize a type of an obstacle.

The obstacle may include bikes, personal mobility, pedestrians, cyclists, traffic lights, traffic signs, crosswalks, guardrails, street trees, safety cones, and the like.

The vehicle control device 160 may recognize an obstacle based on obstacle detection information obtained by the obstacle detector 131, and obtain location information of the recognized obstacle.

The vehicle control device 160 may obtain a tilt of the vehicle based on the tilt information detected by the tilt detector. In this instance, the vehicle control device 160 may obtain information about a direction where the vehicle is tilted.

The vehicle control device 160 may determine whether a wind speed around the vehicle is greater than or equal to a reference wind speed, based on wind speed information obtained by the wind speed detector 133.

Here, the reference wind speed may be a wind strength causing the first and second cargo doors to be opened or closed above a preset force.

The vehicle control device 160 may control an output of warning information notifying that a safety accident may occur due to opening and closing the first and second cargo doors, based on the obtained wind speed, the obtained tilt information and presence or absence of obstacle.

The vehicle control device 160 may control at least one of the display device 141 or the speaker 142 to output the warning information.

When it is determined that a safety accident is likely to occur due to opening and closing the first and second cargo doors, the vehicle control device 160 may control the first safety device 118A and the second safety device 118B.

The vehicle control device 160 may transmit control information of the first safety device 118A and the second safety device 118B to the door control device 170.

The vehicle control device 160 may transmit gear position information, the information about existence of obstacle, the location information of the obstacle, the tilt information and the wind speed information to the door control device 170 through the first communicator 150.

The vehicle may further include a state detection device 119 detecting a state of the cargo door 116.

The state of the cargo door may include an open state, a closed state and a degree of opening of the cargo door.

The state detection device 119 may be provided in each of the first cargo door 116A and the second cargo door 116B.

The state detection device 119 may be one of an acceleration sensor, an inductance sensor, a Hall sensor, an optical sensor, or a gyro sensor.

The vehicle may further include a display device outputting the warning information and provided in the cargo door 116. The display device provided in the cargo door 116 may be a lamp. The lamp may turn on or off in response to an output of the warning information.

The door control device 170 may receive the gear position information, the information about existence of obstacle, the location information of the obstacle, the tilt information and the wind speed information transmitted from the vehicle control device 160.

The door control device 170 may transmit state information of the first cargo door 116A and the second cargo door 116B to the vehicle control device 160.

The door control device 170 may also control operations of the first safety device 118A and the second safety device 118B based on the control information of the first safety device 118A and the second safety device 118B transmitted from the vehicle control device 160.

When opening the first cargo door 116A and the second cargo door 116B, the door control device 170 may control to maintain a movement speed in a moving direction of the cargo door or control to restrict a reverse movement of the cargo door (a movement in an opposite direction to a current moving direction of the door).

When closing the first cargo door 116A and the second cargo door 116B, the door control device 170 may control to maintain a movement speed in a moving direction of the cargo door or control to restrict a reverse movement of the cargo door.

The door control device 170 may include a second communicator 171, a processor 172 and a memory 173.

The second communicator 171 performs communication among the door control device 170 and internal devices of the vehicle 1.

The second communicator 171 may include at least one constituent component enabling communication among the door control device 170 and internal devices of the vehicle 1, for example, at least one of a short-range communication module, wireless communication module, or a wired communication module.

A configuration of the second communicator 171 may be similar to or identical to that of the first communicator 150.

When it is determined that a position of gear position is one of the neutral (N) position, the drive (D) position, or the reverse (R) position, the processor 172 may control a braking device and a locking device of each of the first and second safety devices provided in the first and second cargo doors, respectively, to close and lock the first and second cargo doors.

When it is determined that a position of gear position is one of N, D, or R while at least one of the first and second cargo doors is open, the processor 172 may control an output of warning information, and control the first and second safety devices to fix positions of the first and second cargo doors.

That is, when the first and second cargo doors is being open, the processor 172 may control to maintain a degree of opening of each of the first and second cargo doors, thereby preventing the first and second cargo doors from colliding with obstacles.

The processor 172 may identify a cargo door affected by gravity based on a tilt of the vehicle, and control a movement speed in a moving direction of the cargo door, or control to prevent the cargo door from moving in an opposite direction to the moving direction of the cargo door, based on a degree of opening of the identified cargo door.

The processor 172 may control operations of the first and second safety devices to control movement of the first and second cargo doors.

The processor 172 may determine whether the first and second cargo doors are in a closed state, when it is determined that the gear position is the parking position.

The processor 172 turns on a safety mode, when it is determined that the first and second cargo doors are in a closed state.

The processor 172 may determine whether an obstacle exists around at least one of the first cargo door 116A or the second cargo door 116B based on obstacle detection information of the obstacle detector and image information of the camera. When it is determined that the obstacle exists around at least one of the first cargo door 116A or the second cargo door 116B, the processor 172 outputs warning information notifying that opening or closing the first and second cargo doors is stopped.

The processor 172 identifies a wind speed detected by the wind speed detector, and when it is determined that the identified wind speed is greater than or equal to a reference wind speed, outputs warning information notifying that opening or closing the first cargo door 116A or the second cargo door 116B is stopped.

When it is determined that no obstacle exists around at least one of the first cargo door 116A or the second cargo door 116B and the detected wind speed is less than the reference wind speed, the processor 172 may control to maintain a movement speed in a moving direction of the first cargo door or may control to restrict a reverse movement of the first cargo door based on a degree of opening of the first cargo door, and also may control to maintain a movement speed in a moving direction of the second cargo door or may control to restrict a reverse movement of the second cargo door based on a degree of opening of the second cargo door.

The processor 172 may identify at least two of the gear position, presence or absence of an obstacle, or a wind speed, based on gear position information, obstacle information, and wind speed information, and when it is determined that the gear position is the parking position, the obstacle exists, or the identified wind speed is greater than or equal to a reference wind speed, control the safety device of the corresponding door to fix a position of the door.

The processor 172 determines a slope of a road, i.e., a tilt of the vehicle, based on the tilt information detected by the tilt detector 132, and generates a parameter for controlling the first cargo door 116A or the second cargo door 116B based on the detected tilt information.

The processor 172 determines a direction where the vehicle is tilted and a tilted area, based on the tilt information detected by the tilt detector 132. For example, the processor 172 may determine the tilted direction and tilted area as a front side, a rear side, a left side, or a right side, based on the vehicle.

The processor 172 may control to maintain a movement speed in a moving direction of the first cargo door or may control to restrict a reverse movement of the first cargo door, based on a degree of opening of the first cargo door and the tilted direction.

When it is determined that the vehicle is parked while tilted forward or backward, the processor 172 may control to maintain a movement speed in a moving direction of each of the first and second cargo doors or may control to restrict a reverse movement of each of the first and second cargo doors, based on a first reference opening degree, a degree of opening of each of the first and second cargo doors, and an open or closed state of each of the first and second cargo doors.

When it is determined that the vehicle is parked while tilted to the left or right, the processor 172 may control to maintain a movement speed in a moving direction of each of the first and second cargo doors or may control to restrict a reverse movement of each of the first and second cargo doors, based on a second reference opening degree, a degree of opening of each of the first and second cargo doors, and an open or closed state of each of the first and second cargo doors.

When it is determined that the vehicle is tilted forward and a door is being changed from the closed state to the open state, the processor 172 may determine whether a degree of opening of the door is greater than or equal to the first reference opening degree. When it is determined that the degree of opening of the door is greater than or equal to the first reference opening degree, the processor 172 may control to maintain a movement speed of the door in a moving direction for proceeding to the open state, and when it is determined that the degree of opening of the door is less than the first reference opening degree, may control to restrict a movement of the door in the opposite direction to the moving direction of the door.

When it is determined that the vehicle is tilted forward and a door is being changed to the closed state from the open state, the processor 172 may determine whether a degree of opening of the door is less than the first reference opening degree. When it is determined that the degree of opening of the door is less than the first reference opening degree, the processor 172 may control to maintain a movement speed of the door in a moving direction for proceeding to the closed state, and when it is determined that the degree of opening of the door is greater than or equal to the first reference opening degree, may control to restrict a movement of the door in the opposite direction to the moving direction of the door.

When it is determined that the vehicle is tilted backward and a door is being changed from the closed state to the open state, the processor 172 may determine whether a degree of opening of the door is less than the first reference opening degree. When it is determined that the degree of opening of the door is less than the first reference opening degree, the processor 172 may control to maintain a movement speed of the door in a moving direction for proceeding to the open state, and when it is determined that the degree of opening of the door is greater than or equal to the first reference opening degree, may control to restrict a movement of the door in the opposite direction to the moving direction of the door.

When it is determined that the vehicle is tilted backward and a door is being changed to the closed state from the open state, the processor 172 may determine whether a degree of opening of the door is greater than or equal to the first reference opening degree. When it is determined that the degree of opening of the door is greater than or equal to the first reference opening degree, the processor 172 may control to maintain a movement speed of the door in a moving direction for proceeding to the closed state, and when it is determined that the degree of opening of the door is less than the first reference opening degree, may control to restrict a movement of the door in the opposite direction to the moving direction of the door.

When it is determined that the vehicle is tilted to a first side, the processor 172 may determine whether a door opens or closes on an axis of the first side. When it is determined that the door opens or closes on the axis of the first side and the door is being changed from the closed state to the open state, the processor 172 may determine whether a degree of opening of the door is less than the second reference opening degree. When it is determined that the degree of opening of the door is less than the second reference opening degree, the processor 172 may control to maintain a movement speed of the door in a moving direction for proceeding to the open state, and when it is determined that the degree of opening of the door is greater than or equal to the second reference opening degree, may control to restrict a movement of the door in the opposite direction to the moving direction of the door.

The first side may be a left side or a right side.

When it is determined that the vehicle is tilted to the first side, a door opens or closes on the axis of the first side, and the door is being changed to the closed state from the open state, the processor 172 may determine whether a degree of opening of the door is greater than or equal to the second reference opening degree. When it is determined that the degree of opening of the door is greater than or equal to the second reference opening degree, the processor 172 may control to maintain a movement speed of the door in a moving direction for proceeding to the closed state, and when it is determined that the degree of opening of the door is less than the second reference opening degree, may control to restrict a movement of the door in the opposite direction to the moving direction of the door.

When it is determined that the vehicle is tilted to the first side, the processor 172 may determine whether a door opens or closes on an axis of a second side. When it is determined that the door opens or closes on the axis of the second side and the door is being changed from the closed state to the open state, the processor 172 may determine whether a degree of opening of the door is greater than or equal to the second reference opening degree. When it is determined that the degree of opening of the door is greater than or equal to the second reference opening degree, the processor 172 may control to maintain a movement speed of the door in a moving direction for proceeding to the open state, and when it is determined that the degree of opening of the door is less than the second reference opening degree, may control to restrict a movement of the door in the opposite direction to the moving direction of the door.

When the first side is a left side, the second side may be a right side.

When the first side is a right side, the second side may be a left side.

When it is determined that the vehicle is tilted to the first side, a door opens or closes on the axis of the second side and the door is being changed to the closed state from the open state, the processor 172 may determine whether a degree of opening of the door is less than the second reference opening degree. When it is determined that the degree of opening of the door is less than the second reference opening degree, the processor 172 may control to maintain a movement speed of the door in a moving direction for proceeding to the closed state, and when it is determined that the degree of opening of the door is greater than or equal to the second reference opening degree, may control to restrict a movement of the door in the opposite direction to the moving direction of the door.

When the cargo door is a power sliding door, the processor 172 maintains a movement speed of the cargo door or restricts a reverse movement of the cargo door, thereby preventing overload of a motor due to sudden opening and closing of door.

The processor 172 may perform the above-described operations using data stored in the memory 173.

In this instance, the processor 172 and the memory 173 may be integrated into one chip, or provided in physically separated chips.

The memory 173 may store an algorithm for controlling operations of constituent components of the vehicle or data about a program that reproduces the algorithm.

The memory 173 may store a precision map database.

The memory 173 may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a hard disk drive (HDD), or a compact disc read only memory (CD-ROM), without being limited thereto.

The precision map is a three-dimensional (3D) digital map in which lane information, regulatory information, safety information, and various road facilities are expressed. That is, precision map information includes 3D high-precision data about roads and surrounding facilities.

The precision map may include an electronic map where information about lanes (regulation lines, road boundaries, stop lines, centerlines), road facilities (median strip tunnels, bridges, underpasses) and sign facilities (traffic safety signs, road markings, signals) is produced in 3D.

Figure 5:
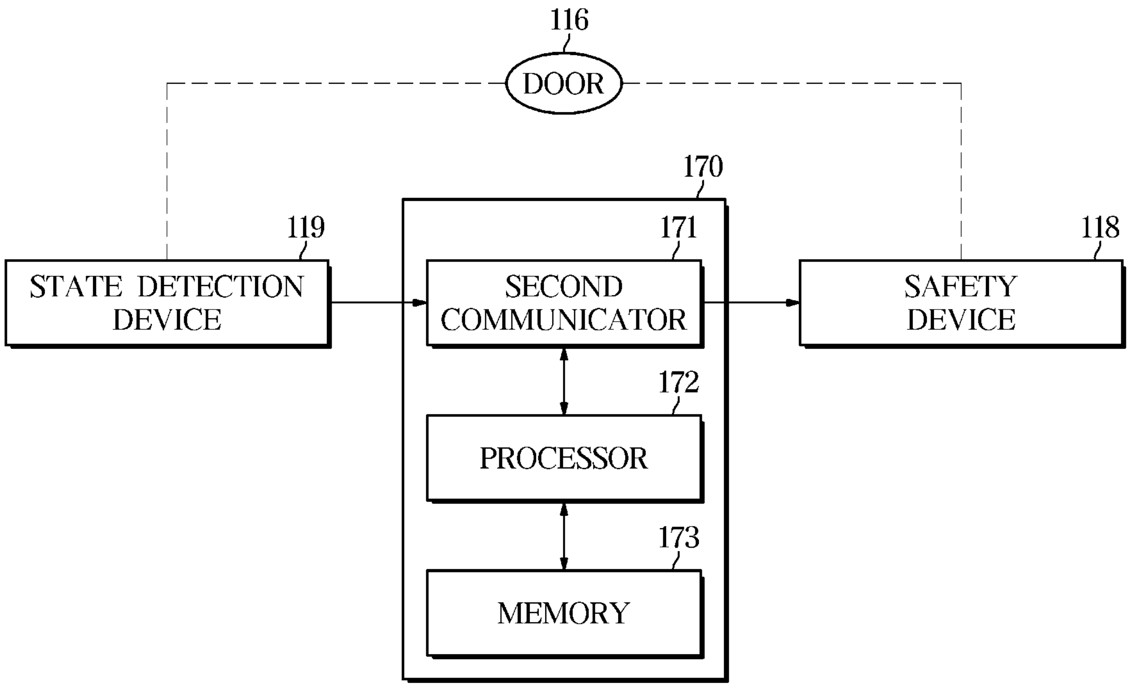
FIG. 5 is a control block diagram of an example of a door control device provided in a vehicle.

At least one constituent component may be added or omitted corresponding to the performance of the constituent components of the vehicle illustrated in FIGS. 4 and 5. Also, it will be easily understood by those skilled in the art that mutual positions of the constituent components may be modified corresponding to the performance or structure of the constituent components.

In some implementations, each of the constituent components of the vehicle illustrated in FIGS. 4 and 5 can refer to a software, and/or a hardware component such as a field-programmable gate array (FPGA) or an application-specific integrated circuit (ASIC).

Figure 6:
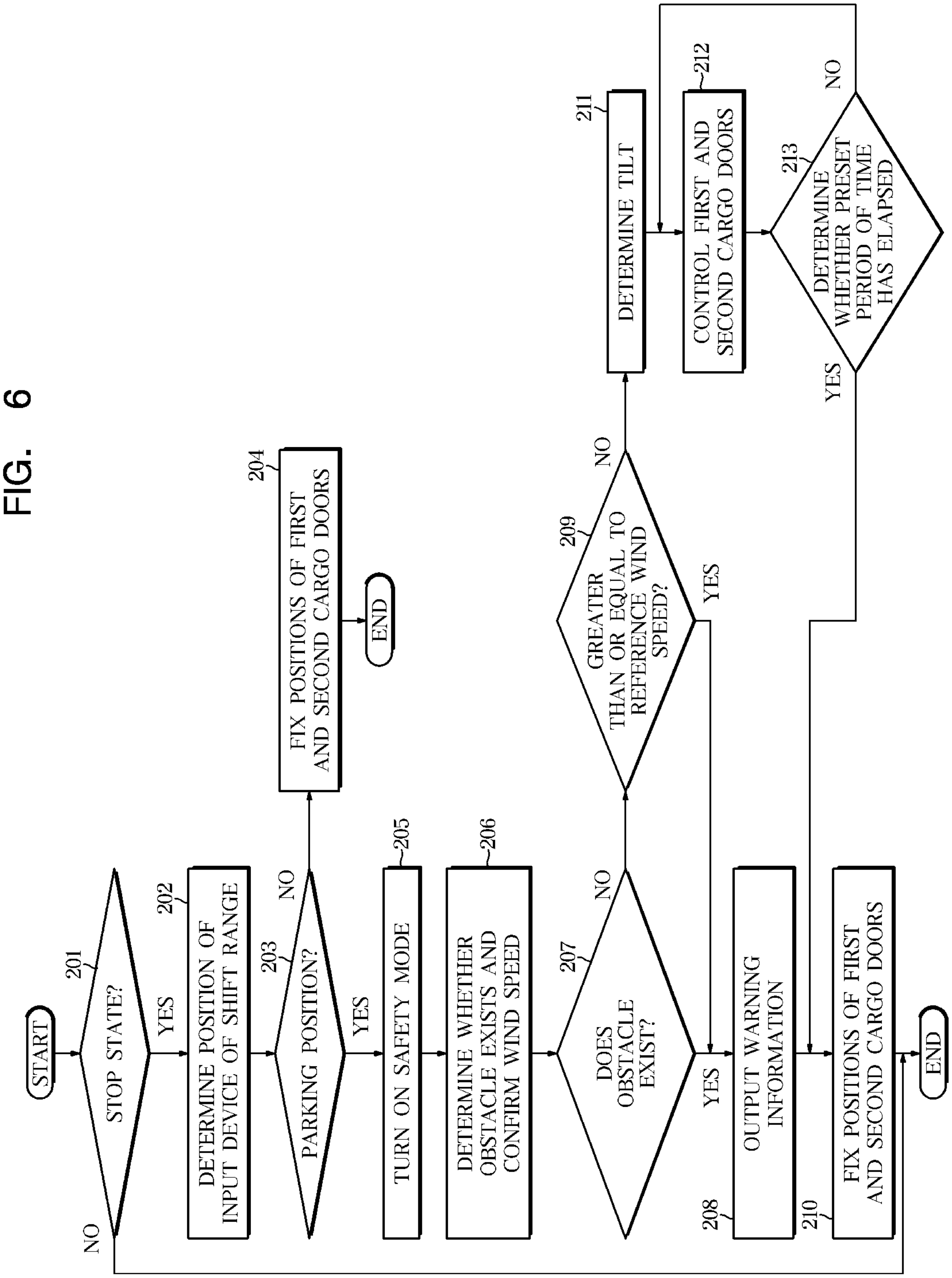
FIG. 6 is a flowchart illustrating an example of operations of controlling a vehicle.

FIG. 6 is a flowchart illustrating operations of controlling a vehicle, which is described with reference to FIGS. 7 to 12.

The vehicle may determine whether the vehicle is in a stop state (201), and when it is determined that the vehicle is in the stop state, determines the gear position of the input device of shift range (202).

The stop state may be a state when a speed of the vehicle is less than or equal to a preset speed.

The vehicle may determine whether the gear position is a parking position (203).

When it is determined that the gear position is one of a neutral (N) position, a drive (D) position, or a reverse (R) position, the vehicle controls a braking device and a locking device of the first and second safety devices provided in the first and second cargo doors, respectively, to fix positions of the first and second cargo doors (204).

When it is determined that the vehicle is in the stop state, the vehicle may determine whether an operation command of an EPB is received. The operation command of EPB may be an engagement command of the EPB.

When it is determined that the gear position is the parking position, the vehicle may determine whether the first and second cargo doors are in a closed state. The closed state may be a state when a degree of opening is 0.

When it is determined that the first and second cargo doors are in the closed state, the vehicle turns on a safety mode (205).

The vehicle identifies surrounding environment information around the vehicle during the safety mode. The surrounding environment information may include obstacle information and road information around the vehicle and weather information.

The vehicle may determine whether an obstacle exists around at least one of the first cargo door 116A and the second cargo door 116B based on obstacle detection information of the obstacle detector and image information of the camera, and identifies a wind speed detected by the wind speed detector (206).

When it is determined that the obstacle exists around at least one of the first cargo door 116A or the second cargo door 116B (207), the vehicle outputs warning information notifying that opening or closing the first cargo door 116A or the second cargo door 116B is stopped (208).

The vehicle may also identify location information of the obstacle, and output warning information notifying that opening or closing a cargo door corresponding to the identified location information of the obstacle is stopped.

The vehicle compares the wind speed detected by the wind speed detector and a reference wind speed, and when it is determined that the detected wind speed is greater than or equal to the reference wind speed (209), outputs the warning information notifying that opening or closing the first cargo door 116A or the second cargo door 116B is stopped (208).

After maintaining a current state of the first cargo door 116A or the second cargo door 116B, the vehicle controls the braking device and the locking device of the first safety device 118A or the second safety device 118B to fix positions of the first cargo door 116A or the second cargo door 116B to the current state (210).

The current state of door may include a closed state and an open state of the door, and when the door is in an open state, the current state may include a degree of opening of the door.

The vehicle fixes the positions of the first and second cargo doors to the current state, and then stops the output of the warning information after a reference period of time.

When it is determined that no obstacle exists around the first cargo door 116A and the second cargo door 116B and the detected wind speed is less than the reference wind speed, the vehicle may control to maintain a movement speed in a moving direction of the first cargo door or may control to restrict a reverse movement of the first cargo door based on a degree of opening of the first cargo door, and also may control to maintain a movement speed in a moving direction of the second cargo door or may control to restrict a reverse movement of the second cargo door based on a degree of opening of the second cargo door.

The vehicle determines a slope of a road, i.e., a tilt of the vehicle, based on tilt information detected by the tilt detector 132 (211).

The vehicle generates a parameter for controlling the first cargo door 116A and the second cargo door 116B based on the detected tilt information.

More specifically, the vehicle may determine whether the vehicle is parked in a flat road or inclined road based on the slope of the road.

When it is determined that the vehicle is parked in the inclined road, the vehicle determines a tilt and a parked state corresponding thereto.

In this instance, the vehicle may determine whether the vehicle is parked in a road tilted forward, backward, to a left side, or to a right side.

That is, the vehicle determines a direction where the vehicle is tilted and a tilted area, based on the tilt information detected by the tilt detector 132. For example, the vehicle may determine the tilted direction and tilted area as a front side, a rear side, a left side, or a right side, based on the vehicle.

The vehicle may control to maintain a movement speed in a moving direction of the first cargo door or may control to restrict a reverse movement of the first cargo door based on a degree of opening of the first cargo door and the tilted direction (212).

The vehicle may control to maintain a movement speed in a moving direction of the second cargo door or may control to restrict a reverse movement of the second cargo door based on a degree of opening of the second cargo door and the tilted direction (212).

That is, the vehicle may control a cargo door affected by gravity depending on an open state or closed state of the first and second cargo doors and the degree of opening of the first and second cargo doors.

The vehicle may control to maintain an opening speed or a closing speed of door, or control to restrict a reverse movement of the door (a movement in an opposite direction to a current moving direction of the door), depending on the open state, closed state, and the degree of opening of the first and second cargo doors.

After controlling the first cargo door 116A or the second cargo door 116B, the vehicle may determine whether a preset period of time has elapsed (213), and when it is determined that the preset period of time has elapsed, controls the braking device and the locking device of each of the first and second safety devices to maintain and fix the current states of the first and second cargo doors (210).

The current state of door may include a closed state and an open state of the door, and when the door is in an open state, the current state may include a degree of opening of the door.

With reference to FIGS. 7 to 10, described is a configuration of controlling a cargo door affected by gravity depending on an open state or closed state of the first and second cargo doors and a degree of opening of the first and second cargo doors.

Figure 7:
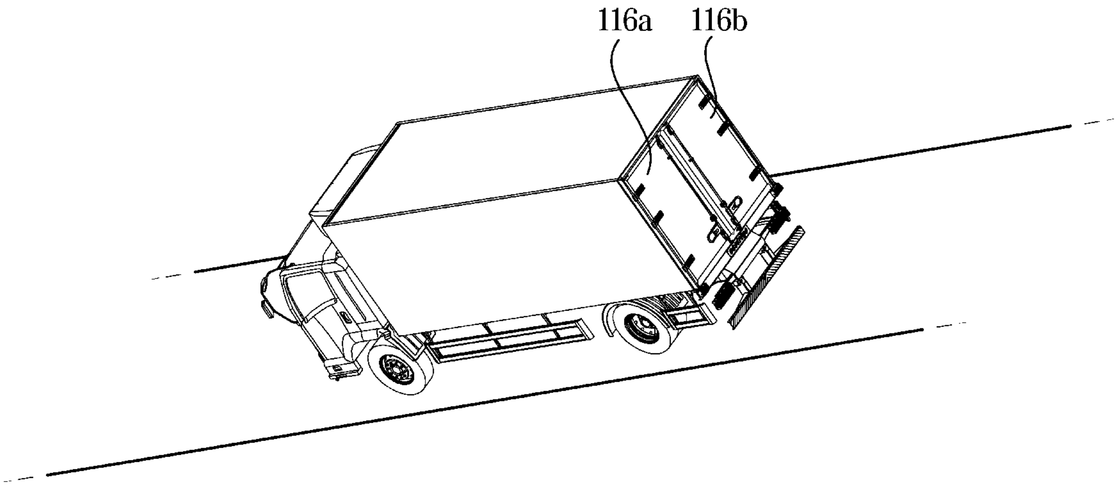
FIGS. 7 to 10 are diagrams illustrating examples of a tilt of a vehicle.

As shown in FIG. 7, an example where the vehicle is parked while tilted forward is described below.

When the vehicle is parked while tilted forward, the first and second cargo doors may be affected by gravity in a forward direction.

The vehicle may identify state information of the first cargo door 116A, and determine whether the first cargo door 116A is being changed from a closed state to an open state based on the identified state information.

When the first cargo door 116A is being changed from the closed state to the open state, the vehicle identifies a degree of opening of the first cargo door 116A. When the degree of opening of the first cargo door 116A is less than a first reference opening degree, the vehicle may control to restrict a reverse movement of the first cargo door 116A, and when the degree of opening of the first cargo door 116A is greater than or equal to the first reference opening degree, may control to maintain a movement speed in a moving direction of the first cargo door 116A.

The moving direction when opening the first cargo door 116A may be clockwise.

A direction of the reverse movement when opening the first cargo door 116A may be counterclockwise.

Through the above, the first cargo door 116A may be prevented from suddenly moving toward a left side of the trailer 115 and an opening side of the trailer 115. In this instance, the first cargo door 116A may be prevented from colliding with an obstacle located in a left side of the vehicle and from colliding with a user located close to the opening side of the trailer 115.

The first reference opening degree may be approximately 90 degrees.

When the first cargo door 116A is being changed from the closed state to the open state and the opening degree is between 0 and 90 degrees, a reverse movement may be controlled to be prevented.

The vehicle may identify state information of the second cargo door 116B, and determine whether the second cargo door 116B is being changed from the closed state to the open state based on the identified state information.

When the second cargo door 116B is being changed from the closed state to the open state, the vehicle identifies a degree of opening of the second cargo door 116B. When the degree of opening of the second cargo door 116B is less than the first reference opening degree, the vehicle may control to restrict a reverse movement of the second cargo door 116B, and when the identified degree of opening of the second cargo door 116B is greater than or equal to the first reference opening degree, may control to maintain a movement speed in a moving direction of the second cargo door 116B.

The moving direction when opening the second cargo door 116B may be counterclockwise. A direction of the reverse movement when opening the second cargo door 116B may be clockwise.

Through the above, the second cargo door 116B may be prevented from suddenly moving toward a right side of the trailer 115 and an opening side of the trailer 115. In this instance, the second cargo door 116B may be prevented from colliding with an obstacle located in a right side of the vehicle and from colliding with a user located close to the opening side of the trailer 115.

When the second cargo door 116B is being changed from the closed state to the open state and the opening degree is between 0 and 90 degrees, a reverse movement may be controlled to be prevented.

By maintaining the movement speed in the respective moving direction when opening the first cargo door 116A and the second cargo door 116B, respectively, the vehicle may prevent the first and second cargo doors from being opened at a speed higher than a preset movement speed.

When the first cargo door 116A is being changed to the closed state from the open state, the vehicle identifies a degree of opening of the first cargo door 116A. When the degree of opening of the first cargo door 116A is less than the first reference opening degree, the vehicle may control to maintain a movement speed in a moving direction of the first cargo door 116A, and when the degree of opening of the first cargo door 116A is greater than or equal to the first reference opening degree, may control to restrict a reverse movement of the first cargo door 116A.

The moving direction when closing the first cargo door 116A may be counterclockwise.

A direction of the reverse movement when closing the first cargo door 116A may be clockwise.

The first reference opening degree may be approximately 90 degrees.

When the first cargo door 116A is being changed to the closed state from the open state and the opening degree is between 0 and 90 degrees, the movement speed in the moving direction of the first cargo door 116A may be controlled to be maintained.

When the second cargo door 116B is being changed to the closed state from the open state, the vehicle identifies a degree of opening of the second cargo door 116B. When the degree of opening of the second cargo door 116B is less than the first reference opening degree, the vehicle may control to maintain a movement speed in a moving direction of the second cargo door 116B, and when the identified degree of opening of the second cargo door 116B is greater than or equal to the first reference opening degree, may control to restrict a reverse movement of the second cargo door 116B.

The moving direction when closing the second cargo door 116B may be clockwise. A direction of the reverse movement when closing the second cargo door 116B may be counterclockwise.

When the second cargo door 116B is being changed to the closed state from the open state and the opening degree is between 0 and 90 degrees, the movement speed in the moving direction of the second cargo door 116B may be controlled to be maintained.

Figure 8:
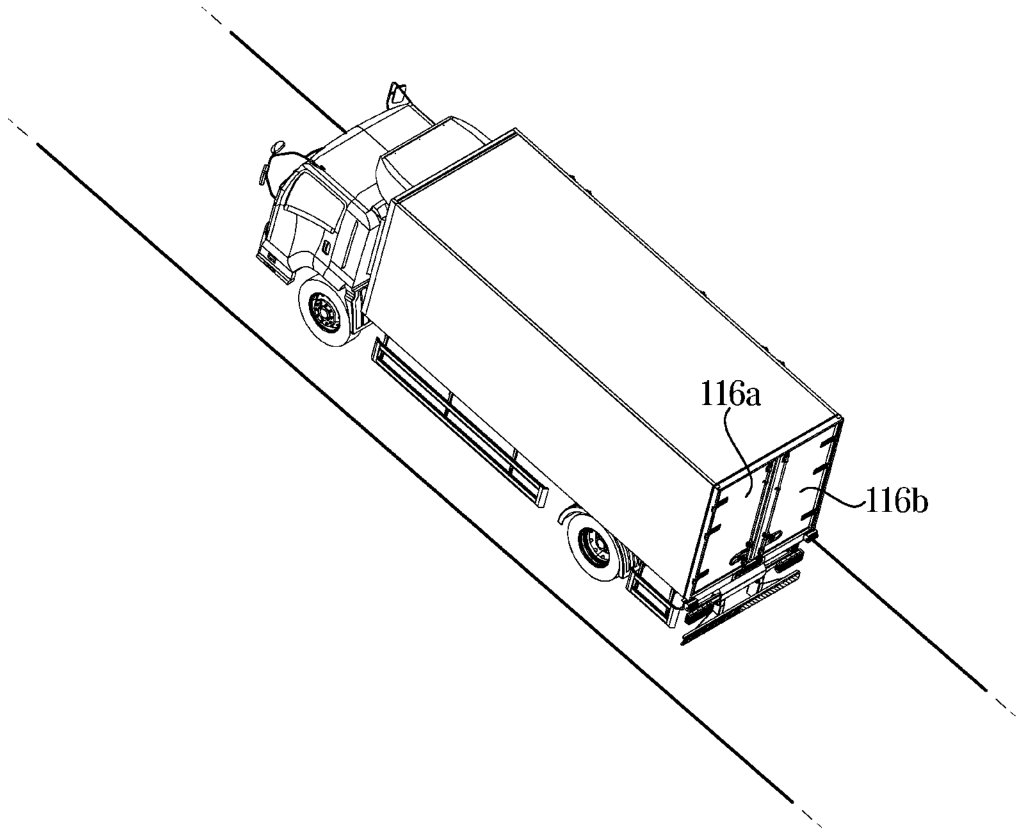

As shown in FIG. 8, an example where the vehicle is parked while tilted backward is described below.

When the vehicle is parked while tilted backward, the first and second cargo doors may be affected by gravity in a backward direction.

The vehicle may identify state information of the first cargo door 116A detected by the state detection device 119, and determine whether the first cargo door 116A is being changed from a closed state to an open state based on the identified state information.

When the first cargo door 116A is being changed from the closed state to the open state, the vehicle identifies a degree of opening of the first cargo door 116A. When the degree of opening of the first cargo door 116A is less than a first reference opening degree, the vehicle may control to maintain a movement speed in a moving direction of the first cargo door 116A, and when the degree of opening of the first cargo door 116A is greater than or equal to the first reference opening degree, may control to restrict a reverse movement of the first cargo door 116A.

The first reference opening degree may be approximately 90 degrees.

When the first cargo door 116A is being changed from the closed state to the open state and the opening degree is between 0 and 90 degrees, the movement speed in the moving direction of the first cargo door 116A may be controlled to be maintained.

The vehicle may identify state information of the second cargo door 116B, and determine whether the second cargo door 116B is being changed from a closed state to an open state based on the identified state information.

When the second cargo door 116B is being changed from the closed state to the open state, the vehicle identifies a degree of opening of the second cargo door 116B. When the degree of opening of the second cargo door 116B is less than the first reference opening degree, the vehicle may control to maintain a movement speed in a moving direction of the second cargo door 116B, and when the identified degree of opening of the second cargo door 116B is greater than or equal to the first reference opening degree, may control to restrict a reverse movement of the second cargo door 116B.

When the second cargo door 116B is being changed from the closed state to the open state and the opening degree is between 0 and 90 degrees, the movement speed in the moving direction of the second cargo door 116B may be controlled to be maintained.

Controlling to maintain the movement speed in the moving direction may include controlling a cargo door to move below a preset movement speed or at the preset movement speed.

By controlling to maintain the movement speed in the moving direction when opening the first and second cargo doors, the vehicle may prevent the cargo doors from being opened above the preset movement speed.

When the first cargo door 116A is being changed to the closed state from the open state, the vehicle identifies a degree of opening of the first cargo door 116A. When the degree of opening of the first cargo door 116A is less than the first reference opening degree, the vehicle may control to restrict a reverse movement of the first cargo door 116A, and when the degree of opening of the first cargo door 116A is greater than or equal to the first reference opening degree, may control to maintain a movement speed in a moving direction of the first cargo door 116A.

When the first cargo door 116A is being changed to the closed state from the open state and the opening degree is between 0 and 90 degrees, the reverse movement may be controlled to be prevented.

When the second cargo door 116B is being changed to the closed state from the open state, the vehicle identifies a degree of opening of the second cargo door 116B. When the degree of opening of the second cargo door 116B is less than the first reference opening degree, the vehicle may control to restrict a reverse movement of the second cargo door 116B, and when the identified degree of opening of the second cargo door 116B is greater than or equal to the first reference opening degree, may control to maintain a movement speed in a moving direction of the second cargo door 116B.

When the second cargo door 116B is being changed to the closed state from the open state and the opening degree is between 0 and 90 degrees, the reverse movement may be controlled to be prevented.

Figure 9:
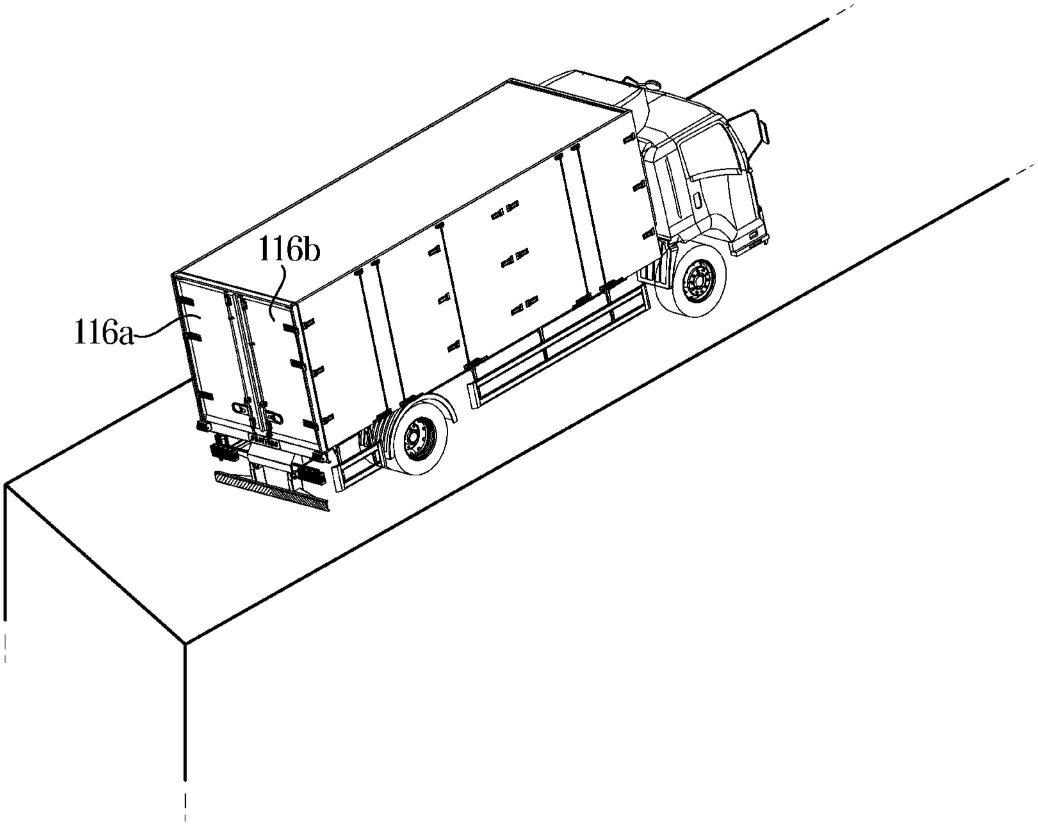

As shown in FIG. 9, an example where the vehicle is parked while tilted to the left is described below.

When the vehicle is parked while tilted to the left, the first and second cargo doors may be affected by gravity in a left direction of the vehicle.

The vehicle may identify state information of the first cargo door 116A, and determine whether the first cargo door 116A is being changed from a closed state to an open state based on the identified state information.

When the first cargo door 116A is being changed from the closed state to the open state, the vehicle identifies a degree of opening of the first cargo door 116A. When the degree of opening of the first cargo door 116A is less than a second reference opening degree, the vehicle may control to maintain a movement speed in a moving direction of the first cargo door 116A, and when the identified degree of opening of the first cargo door 116A is greater than or equal to the second reference opening degree, may control to restrict a reverse movement of the first cargo door 116A.

The second reference opening degree may be approximately 180 degrees.

When the first cargo door 116A is being changed from the closed state to the open state and the opening degree is greater than or equal to 0 and less than 180 degrees, the movement speed in the moving direction of the first cargo door 116A may be controlled to be maintained.

The vehicle may identify state information of the second cargo door 116B, and determine whether the second cargo door 116B is being changed from a closed state to an open state based on the identified state information.

When the second cargo door 116B is being changed from the closed state to the open state, the vehicle identifies a degree of opening of the second cargo door 116B. When the degree of opening of the second cargo door 116B is less than the second reference opening degree, the vehicle may control to restrict a reverse movement of the second cargo door 116B, and when the identified degree of opening of the second cargo door 116B is greater than or equal to the second reference opening degree, may control to maintain a movement speed in a moving direction of the second cargo door 116B.

When the second cargo door 116B is being changed from the closed state to the open state and the opening degree is greater than or equal to 0 and less than 180 degrees, the reverse movement may be controlled to be prevented.

By maintaining the movement speed in the respective moving direction when opening the first cargo door 116A and the second cargo door 116B, respectively, the vehicle may prevent the first and second cargo doors from being opened at a speed higher than a preset movement speed.

When the first cargo door 116A is being changed to the closed state from the open state, the vehicle identifies a degree of opening of the first cargo door 116A. When the degree of opening of the first cargo door 116A is less than a second reference opening degree, the vehicle may control to restrict a reverse movement of the first cargo door 116A, and when the identified degree of opening of the first cargo door 116A is greater than or equal to the second reference opening degree, may control to maintain a movement speed in a moving direction of the first cargo door 116A.

The second reference opening degree may be approximately 180 degrees.

When the first cargo door 116A is being changed to the closed state from the open state and the opening degree is greater than or equal to 0 and less than 90 degrees, the reverse movement may be controlled to be prevented.

When the second cargo door 116B is being changed to the closed state from the open state, the vehicle identifies a degree of opening of the second cargo door 116B. When the degree of opening of the second cargo door 116B is less than the second reference opening degree, the vehicle may control to maintain a movement speed in a moving direction of the second cargo door 116B, and when the identified degree of opening of the second cargo door 116B is greater than or equal to the second reference opening degree, may control to restrict a reverse movement of the second cargo door 116B.

When the second cargo door 116B is being changed to the closed state from the open state and the opening degree is greater than or equal to 0 and less than 90 degrees, the movement speed in the moving direction of the second cargo door 116B may be controlled to be maintained.

Figure 10:
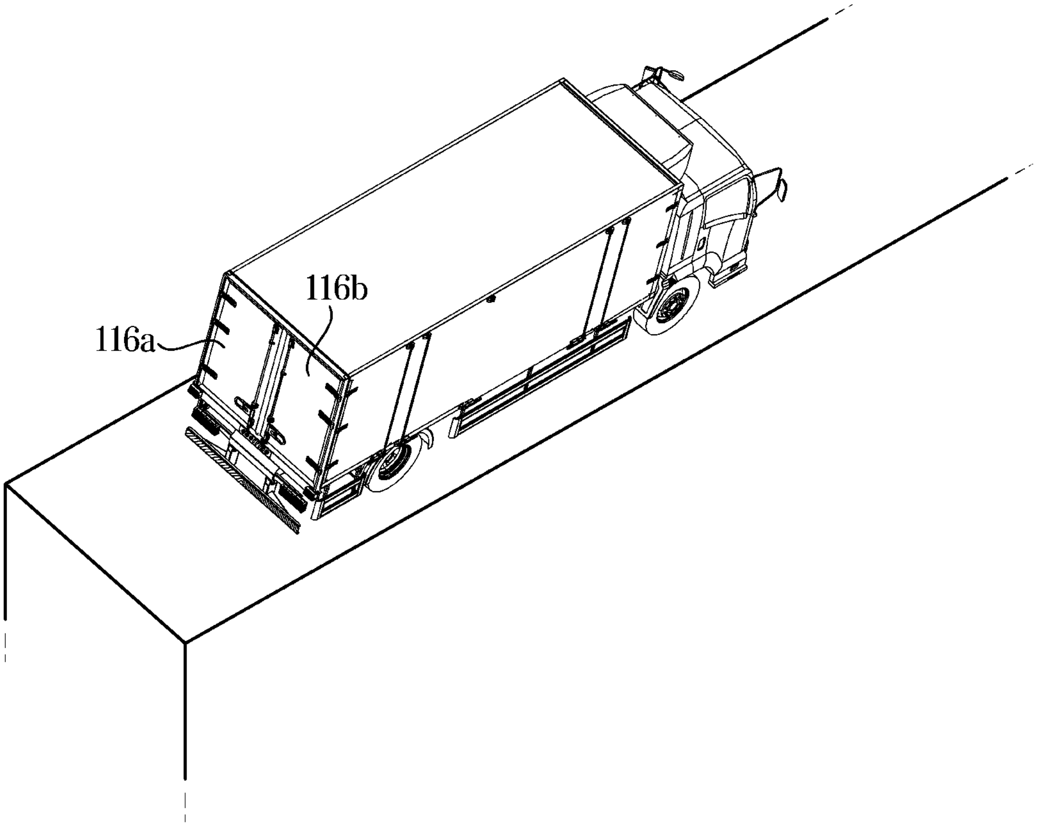

As shown in FIG. 10, an example where the vehicle is parked while tilted to the right is described below.

When the vehicle is parked while tilted to the right, the first and second cargo doors may be affected by gravity in a right direction of the vehicle.

The vehicle may identify state information of the first cargo door 116A, and determine whether the first cargo door 116A is being changed from a closed state to an open state based on the identified state information.

When the first cargo door 116A is being changed from the closed state to the open state, the vehicle identifies a degree of opening of the first cargo door 116A. When the degree of opening of the first cargo door 116A is less than a second reference opening degree, the vehicle may control to restrict a reverse movement of the first cargo door 116A, and when the identified degree of opening of the first cargo door 116A is greater than or equal to the second reference opening degree, may control to maintain a movement speed in a moving direction of the first cargo door 116A.

The second reference opening degree may be approximately 180 degrees.

When the first cargo door 116A is being changed from the closed state to the open state and the opening degree is greater than or equal to 0 and less than 180 degrees, the reverse movement may be controlled to be prevented.

The vehicle may identify state information of the second cargo door 116B, and determine whether the second cargo door 116B is being changed from a closed state to an open state based on the identified state information.

When the second cargo door 116B is being changed from the closed state to the open state, the vehicle identifies a degree of opening of the second cargo door 116B. When the degree of opening of the second cargo door 116B is less than the second reference opening degree, the vehicle may control to maintain a movement speed in a moving direction of the second cargo door 116B, and when the identified degree of opening of the second cargo door 116B is greater than or equal to the second reference opening degree, may control to restrict a reverse movement of the second cargo door 116B.

When the second cargo door 116B is being changed from the closed state to the open state and the opening degree is greater than or equal to 0 and less than 180 degrees, the movement speed in the moving direction of the second cargo door 116B may be controlled to be maintained.

By maintaining the movement speed in the respective moving direction when opening the first cargo door 116A and the second cargo door 116B, respectively, the vehicle may prevent the first and second cargo doors from being opened at a speed higher than a preset movement speed.

When the first cargo door 116A is being changed to the closed state from the open state, the vehicle identifies a degree of opening of the first cargo door 116A. When the degree of opening of the first cargo door 116A is less than a second reference opening degree, the vehicle may control to maintain a movement speed in a moving direction of the first cargo door 116A, and when the identified degree of opening of the first cargo door 116A is greater than or equal to the second reference opening degree, may control to restrict a reverse movement of the first cargo door 116A.

The second reference opening degree may be approximately 180 degrees.

When the first cargo door 116A is being changed to the closed state from the open state and the opening degree is greater than or equal to 0 and less than 90 degrees, the movement speed in the moving direction of the second cargo door 116B may be controlled to be maintained.

When the second cargo door 116B is being changed to the closed state from the open state, the vehicle identifies a degree of opening of the second cargo door 116B. When the degree of opening of the second cargo door 116B is less than the second reference opening degree, the vehicle may control to restrict a reverse movement of the second cargo door 116B, and when the identified degree of opening of the second cargo door 116B is greater than or equal to the second reference opening degree, may control to maintain a movement speed in a moving direction of the second cargo door 116B.

When the second cargo door 116B is being changed to the closed state from the open state and the opening degree is greater than or equal to 0 and less than 90 degrees, the reverse movement may be controlled to be prevented.

Parameters controlling movement of the first and second cargo doors based on a tilt of the vehicle, an open or closed state of the first and second cargo doors, and a degree of opening of the first and second cargo doors may be set and stored as a table in advance, as shown in FIGS. 11 and 12.

In some cases, the above-described implementations can be stored in the form of a recording medium storing computer-executable instructions. The instructions may be stored in the form of a program code, and when executed by a processor, the instructions may perform operations of the disclosed implementations. The recording medium may be implemented as a computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

As is apparent from the above, in some implementations, a safety accident occurring due to a blind spot when opening a cargo door can be prevented.

In some implementations, when opening or closing a cargo door, a movement speed of the cargo door can be maintained or reverse movement of the cargo door can be restricted depending on a tilt of a vehicle, thereby preparing for a situation caused by sudden opening or closing of the cargo door in advance.

In some implementations, even when a cargo door of a vehicle is not locked after closing, braking and locking of the cargo door can be automatically performed by determining state information and a driving state of the vehicle and responding to a current driving state, thereby preventing safety accidents during driving.

In some implementations, safety of all the nearby obstacles including pedestrians and other mobility as well as a user of a vehicle can be secured.

In some implementations, even in power sliding doors, overload of a motor can be prevented.

In some implementations, even in an autonomous vehicle, safety of nearby obstacles can be secured when loading and unloading cargo.

In some implementations, only a change in software is required, thereby preventing a cost of adding and manufacturing hardware.

In some implementations, a quality and marketability of a vehicle can be improved and safety and competitiveness of the vehicle can be enhanced.

What is claimed is:

1. A door control device, comprising:

a communicator configured to receive gear position information, obstacle information, wind speed information, and tilt information of a vehicle;

a state detection device configured to detect state information of the door; and a processor configured to:

determine at least two of a gear position, presence or absence of an obstacle, or a wind speed based on the gear position information, the obstacle information, and the wind speed information, based on a determination that (i) the gear position is at parking and the obstacle exists or (ii) the gear position is at parking and the wind speed is greater than or equal to a reference wind speed, control a safety device of a door to secure a position of the door, determine whether the vehicle is tilted forward, backward, to a first side, or a second side based on the tilt information of the vehicle, based on a determination that the gear position is at parking and no obstacle exists or the wind speed is less than a reference wind speed, determine, based on the state information of the door, whether a state of the door is changed from (i) a closed state to an open state or (ii) from the open state to the closed state, determine a degree of opening of the door based on the state information of the door, control, based on the received tilt information of the vehicle, the state information of the door, and the degree of opening of the door, the door to maintain a movement speed or to limit movement in a direction opposite to a moving direction of the door, and based on a determination that a preset period of time has elapsed, control the safety device to secure the position of the door.

2. The door control device of claim 1, further comprising:

a display device provided on the door, wherein the processor is configured to, based on the determination that (i) the gear position is at parking and the obstacle exists or (ii) the gear position is at parking and the wind speed is greater than or equal to the reference wind speed, control the display device to display warning information.

3. The door control device of claim 1, wherein the processor is configured to, based on the gear position being at drive, reverse, or neutral, control the door to be locked.

4. The door control device of claim 1, wherein the processor is configured to:

based on a determination that the vehicle is tilted forward and the state of the door is changed from the closed state to the open state, determine whether the degree of opening of the door is greater than or equal to a first reference opening degree, based on a determination that the degree of opening of the door is greater than or equal to the first reference opening degree, control the door to maintain a movement speed in a moving direction of the door for the state of the door to enter the open state, and based on a determination that the degree of opening of the door is less than the first reference opening degree, control the door to limit movement in a direction opposite to the moving direction of the door.

5. The door control device of claim 1, wherein the processor is configured to:

based on a determination that the vehicle is tilted forward and the state of the door is changed to the closed state from the open state, determine whether the degree of opening of the door is less than a first reference opening degree, based on a determination that the degree of opening of the door is less than the first reference opening degree, control the door to maintain a movement speed in a moving direction of the door for the state of the door to enter the closed state, and based on a determination that the degree of opening of the door is greater than or equal to the first reference opening degree, control the door to limit movement in a direction opposite to the moving direction of the door.

6. The door control device of claim 1, wherein the processor is configured to:

based on a determination that the vehicle is tilted backward and the state of the door is changed from the closed state to the open state, determine whether the degree of opening of the door is less than a first reference opening degree, based on a determination that the degree of opening of the door is less than the first reference opening degree, control the door to maintain a movement speed in a moving direction of the door for the state of the door to enter the open state, and based on a determination that the degree of opening of the door is greater than or equal to the first reference opening degree, control the door to limit movement in a direction opposite to the moving direction of the door.

7. The door control device of claim 1, wherein the processor is configured to:

based on a determination that the vehicle is tilted backward and the state of the door is changed to the closed state from the open state, determine whether the degree of opening of the door is greater than or equal to a first reference opening degree, based on a determination that the degree of opening of the door is greater than or equal to the first reference opening degree, control the door to maintain a movement speed in a moving direction of the door for the state of the door to enter the closed state, and based on a determination that the degree of opening of the door is less than the first reference opening degree, control the door to limit movement in a direction opposite to the moving direction of the door.

8. The door control device of claim 1, wherein the processor is configured to:

based on the vehicle being tilted to the first side, determine whether the door opens or closes on an axis of the first side, based on a determination that the door opens or closes on the axis of the first side and the state of the door is changed from the closed state to the open state, determine whether the degree of opening of the door is less than a second reference opening degree, based on a determination that the degree of opening of the door is less than the second reference opening degree, control the door to maintain a movement speed in a moving direction of the door for the state of the door to enter the open state, and based on a determination that the degree of opening of the door is greater than or equal to the second reference opening degree, control the door to limit movement in a direction opposite to the moving direction of the door.

9. The door control device of claim 1, wherein the processor is configured to:

based on a determination that the vehicle is tilted to the first side, the door opens or closes on an axis of the first side, and the state of the door is changed to the closed state from the open state, determine whether the degree of opening of the door is greater than or equal to a second reference opening degree, based on a determination that the degree of opening of the door is greater than or equal to the second reference opening degree, control the door to maintain a movement speed in a moving direction of the door for the state of the door to enter the closed state, and based on a determination that the degree of opening of the door is less than the second reference opening degree, control the door to limit movement in a direction opposite to the moving direction of the door.

10. The door control device of claim 1, wherein the processor is configured to:

based on the vehicle being tilted to the first side, determine whether the door opens or closes on an axis of the second side, based on a determination that the door opens or closes on the axis of the second side and the state of the door is changed from the closed state to the open state, determine whether the degree of opening of the door is greater than or equal to a second reference opening degree, based on a determination that the degree of opening of the door is greater than or equal to the second reference opening degree, control the door to maintain a movement speed in a moving direction for the state of the door to enter the open state, and based on a determination that the degree of opening of the door is less than the second reference opening degree, control the door to limit movement in a direction opposite to the moving direction of the door.

11. The door control device of claim 1, wherein the processor is configured to:

based on a determination that the vehicle is tilted to the first side, the door opens or closes on an axis of the second side, and the state of the door is changed to the closed state from the open state, determine whether the degree of opening of the door is less than a second reference opening degree, based on a determination that the degree of opening of the door is less than the second reference opening degree, control the door to maintain a movement speed in a moving direction for the state of the door to enter the closed state, and based on a determination that the degree of opening of the door is greater than or equal to the second reference opening degree, control the door to limit movement in a direction opposite to the moving direction of the door.

12. A vehicle, comprising:

a door;

a safety device provided at the door;

a state detection device configured to detect a state of the door;

an input device of shift range;

a tilt detector configured to detect a tilt of the vehicle; and a door control device configured to:

turn on a safety mode in response to a gear position of the input device of shift range being at parking, in the safety mode, control, based on the detected tilt of the vehicle, the door to maintain a movement speed or limit movement, determine, based on tilt information of the vehicle, whether the vehicle is tilted forward, backward, to a first side or a second side, determine whether the state of the door is changed from (i) a closed state to an open state or (ii) the open state to the closed state, based on state information of the door, identify a degree of opening of the door based on the state information of the door, control, based on the tilt information of the vehicle, the state information of the door, and the degree of opening of the door, the door to maintain a movement speed or to limit movement in a direction opposite to a moving direction of the door, and based on a determination that a preset period of time has elapsed, control the safety device of the door to secure a position of the door.

13. The vehicle of claim 12, further comprising:

at least one of a camera or an obstacle detector, wherein the door control device is configured to:

determine whether an obstacle exists based on image information received from the camera and obstacle detection information received from the obstacle detector, and based on a determination that the obstacle exists, control the safety device to secure a position of the door.

14. The vehicle of claim 13, further comprising:

at least one of a display device or a speaker, wherein the door control device is configured to:

based on a determination that the obstacle exists, control at least one of the display device or the speaker to output warning information.

15. The vehicle of claim 12, further comprising:

a wind speed detector configured to detect a wind speed, wherein the door control device is configured to:

determine whether the detected wind speed is greater than or equal to a reference wind speed based on information regarding the detected wind speed, and based on a determination that the detected wind speed is greater than or equal to the reference wind speed, control the safety device to secure a position of the door.

16. The vehicle of claim 12, wherein the door control device is configured to, based on the gear position being set to drive, reverse, or neutral, control the door to be locked.

17. The vehicle of claim 12, wherein the door control device is configured to, based on the movement speed of the door being controlled to be maintained, control the door to not move above a preset movement speed.

18. The vehicle of claim 12, wherein the safety device comprises (i) a braking device configured to control braking of the door and (ii) a locking device configured to control locking of the door.

* * * * *